(12) United States Patent
Zinn

(10) Patent No.: US 10,847,022 B2
(45) Date of Patent: Nov. 24, 2020

(54) METHOD AND SYSTEM FOR OPERATING TECHNOLOGICAL DEVICES OF AUTOMATING TECHNOLOGY

(71) Applicant: SCHNEIDER ELECTRIC INDUSTRIES SAS, Rueil-Malmaison (FR)

(72) Inventor: Marcus Zinn, Rodgau (DE)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 15/813,216

(22) Filed: Nov. 15, 2017

(65) Prior Publication Data

US 2018/0144616 A1    May 24, 2018

(30) Foreign Application Priority Data

Nov. 18, 2016   (EP) ..................... 16199562

(51) Int. Cl.
G08C 17/02    (2006.01)
G05B 19/042    (2006.01)
G05B 19/418    (2006.01)

(52) U.S. Cl.
CPC .......... *G08C 17/02* (2013.01); *G05B 19/042* (2013.01); *G05B 19/41855* (2013.01);
(Continued)

(58) Field of Classification Search
CPC ................. G08C 17/00; G08C 17/02
(Continued)

(56) References Cited

U.S. PATENT DOCUMENTS 7,027,881 B2 * 4/2006 Yumoto ................. G08C 17/02
700/168
9,353,965 B1 * 5/2016 Goyal ..................... G06F 3/011
(Continued)

FOREIGN PATENT DOCUMENTS

DE    10 2005 037280 A1    2/2007
EP      1 655 984 A1    5/2006

OTHER PUBLICATIONS

Wu et al., A Multi-Purpose Remote Controller Based on Bluetooth Mobile Phone, Dec. 7-10, 2010, IEEE, 978-1-4244-7815-6/10/$26.00, pp. 358-363 (Year: 2010).*

(Continued)

*Primary Examiner* — Carlos Garcia
(74) *Attorney, Agent, or Firm* — Ladas & Parry, LLP; Malcolm J. MacDonald

(57) ABSTRACT

The invention relates to a method and a system for operating a technological device, in particular a device of automating technology such as a controller, sensor or actor by a mobile device such as a smartphone, tablet or PDA, wherein information is exchanged via a wireless communication connection between the technological device and the mobile device. In order to broaden the scope of the function of the technological device at least temporarily, it is provided that at least one software component which can be invoked by the technological device for executing one or more functions is hosted in a runtime environment of the mobile device, and that the at least one software component is invoked via the wireless communication connection by invoking a function of the technological device and is executed and is used in the runtime environment of the mobile device.

5 Claims, 5 Drawing Sheets

Figure 1:
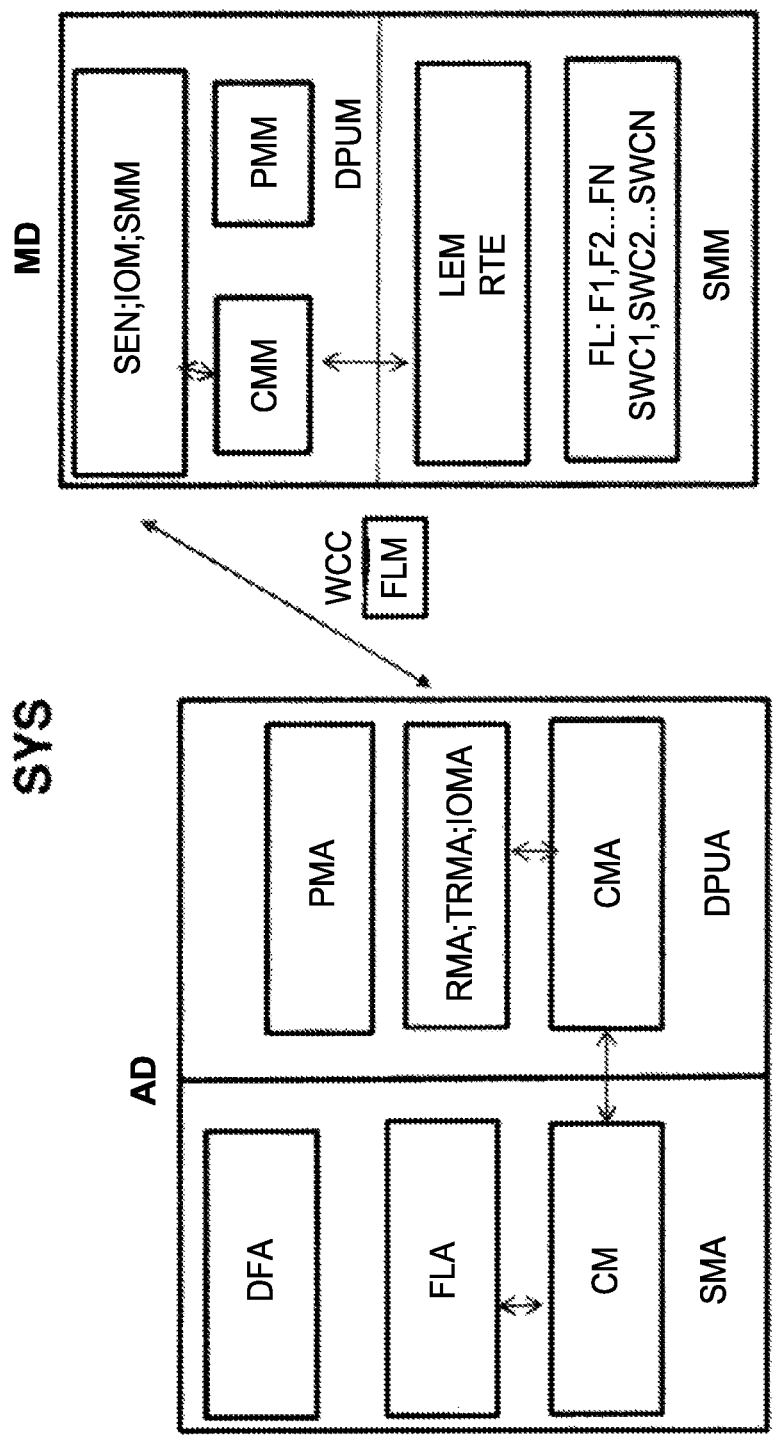

(52) U.S. Cl.
CPC ..... *G08C 2201/30* (2013.01); *G08C 2201/91* (2013.01); *G08C 2201/93* (2013.01); *Y02P 90/02* (2015.11)

(58) Field of Classification Search
USPC .............................................. 340/12.5, 12.52
See application file for complete search history.

(56) References Cited

U.S. PATENT DOCUMENTS

| | | | | |
|---|---|---|---|---|
| 9,851,937 | B2* | 12/2017 | Jang ........................ | G06F 3/165 |
| 9,936,390 | B2* | 4/2018 | Zhang .................... | H04W 12/08 |
| 9,942,763 | B2* | 4/2018 | Zhang .................... | H04W 12/08 |
| 2007/0268360 | A1* | 11/2007 | Ahlgren ................. | G08C 17/02 |
| | | | | 348/14.01 |
| 2009/0033515 | A1* | 2/2009 | Cavanaugh ............. | H04W 4/02 |
| | | | | 340/8.1 |
| 2009/0089885 | A1* | 4/2009 | Noble ................ | H04N 7/17309 |
| | | | | 726/29 |
| 2010/0262953 | A1* | 10/2010 | Barboni .................... | G06F 8/64 |
| | | | | 717/120 |
| 2012/0310382 | A1 | 12/2012 | Karaffa et al. | |
| 2013/0086518 | A1* | 4/2013 | Park ........................ | H04L 67/12 |
| | | | | 715/808 |
| 2015/0206203 | A1* | 7/2015 | Tietzen ............... | G06Q 30/0279 |
| | | | | 705/14.3 |
| 2017/0038787 | A1* | 2/2017 | Baker ................ | H05B 37/0272 |
| 2017/0150358 | A1* | 5/2017 | Zhang ................... | H04W 12/08 |
| 2018/0074783 | A1* | 3/2018 | Jang ........................ | G06F 3/165 |
| 2018/0316390 | A1* | 11/2018 | Wang ....................... | H04W 4/80 |

OTHER PUBLICATIONS

European Search Report, dated May 29, 2017, for EP Application 16 19 9562.

* cited by examiner

METHOD AND SYSTEM FOR OPERATING TECHNOLOGICAL DEVICES OF AUTOMATING TECHNOLOGY

The invention relates to a method for starting up and diagnosing an automatic device in a form of a controller, a sensor, or an actor, by using a software component comprising device-specific starting up functions and diagnosing functions by means of a mobile device.

A method and a system of the initially cited type is described in US 2012/03106382 A1. An industrial control system comprises an alarm server with a processor which is configured to receive device information which is representative for field device information which is extracted from a device definition file. The processor is furthermore configured to translate the device information into a first format which can be interpreted by a global system for a mobile communication server and to make the device information in the first format available for the mobile communication server.

DE 10 2005 037 280 A1 relates to a method for the communication of a mobile device with a working device in which a communication connection is built up between the mobile device and the working device. The application is loaded from the working device onto the mobile device and the loaded application is executed on the mobile device. Data of the working device is read out and/or modified using the application.

EP 1 655 984 B1 relates to a method and a system for operating and observing technological devices. In the method spatially limited communication fields are generated with at least a first and a second transmitting means wherein the first transmitting means is associated with a technological device and the second transmitting means is associated with a mobile device, for example for operating and observing the technological device. In the case of an overlapping of the communication fields generated by the transmitting means, information is exchanged in a wireless manner between the technological device and the mobile device.

It is provided according to the prior art that the mobile device is a mobile HMI unit (HMI=Human Machine Interface) that can be moved by a user. The mobile device can be constructed as a web pad, PDA or a mobile telephone.

According to the prior art, e.g. measured values, configuration data and/or parameter data can be transmitted from the technological device to the mobile device and can be displayed in a user surface on the mobile device. There is also the possibility of operating software components in the technological device and of observing executions of technological actions. The mobile device can be used to operate and observe functions of the technological device without, however, the scope of the functions of the technological device being expanded.

In order to expand the scope of the functions, i.e., in particular the number and type of the executable software components, calculating power and/or storage capacity, according to the prior art an intervention into the hardware of the technological device is necessary, for example by the replacement of hardware components. However, this is associated with significant complexity and expenditures, which is undesirable, especially since an increased scope of the functions of the technological device is frequently only temporarily required.

Starting from the above, the present invention has the basic problem of further developing a method and a system of the initially cited type in such a manner that the scope of the functions, in particular the type and scope of the executable software components and software-based functions, of a technological device can be at least temporarily expanded in a simple and reliable manner.

The problem is solved in accordance with the invention, among other things, by the features of claim 1. In a runtime environment of the mobile device at least one software component which can be invoked by the technological device is hosted for carrying out one or more functions. The at least one software component is invoked via the wireless communication connection by a function call of the technological device and is carried out and used in the runtime environment of the mobile device.

The mobile device transmits, after the establishing of the wireless communication connection, a function list of available functions and/or available software components to the technological device, wherein the at least one available function and/or available software component is added to an internal function list of already available internal functions or software components of the technological device.

The invention is based on the idea of making software components available in a mobile device such as, for example, a smartphone which are carried out by a technological device such as an automating device in the mobile device. It is provided to this end that the mobile device hosts the software components and a runtime environment for carrying out the software components.

The software components can only be invoked by the technological device when the mobile device is located in the vicinity of the technological device.

This results in the possibility of temporarily broadening the scope of the software function of the technological device such as an automating device without changing the hardware and/or software of the automating device. A broadening of the functions of the automating device only takes place if the mobile device is located in the vicinity of the automating device. In particular during the broadening of firmware properties, the cybersecurity (data safety) is increased by the method according to the invention. A viewpoint of cybersecurity is directed toward preventing the source code of an automating device from being illegally evaluated. The more software components are implemented in an automating device, in particular in the firmware, the greater the possibility of attackers gaining access to the automating device.

The method according to the invention prevents the illegal access to software components since the software components are only accessible if a mobile device is in the vicinity of the automating device and makes the software component available. Since the software components are not in the automating device itself but rather are hosted only in the mobile device, the automating device is therefore less endangered by external attacks.

According to a preferred embodiment, it is provided that the wireless communication connection and the exchange of information is activated when the mobile device is located in the vicinity of the technological device. This ensures that the sensitive software components are only available for the automating device and/or users of the automating device when the mobile device is located in the vicinity of the technological device.

The closeness of the mobile device to the technological device is preferably detected by an approximation sensor in the technological device. The approximation sensor generates a spatially limited communication field (close field), wherein the mobile device comprises a second approximation sensor which also generates a spatially limited communication field (close field), wherein upon an approximation of the communication fields the wireless communication connection is established by the superposing of the communication fields between the technological and the mobile device.

Alternatively, there is also the possibility that an approximation sensor on, e.g., a capacitive or an inductive basis is integrated into the technological device and in the mobile device, and that upon an approximation a wireless communication connection is established in Wi-Fi technology or Bluetooth technology.

According to another preferred embodiment the internal and external functions and/or software components cited in the list of the technological device are made available for calling for an external user coupled to the technological device. An external user can be a user, an external system and/or the mobile device itself.

Another preferred procedure is distinguished in that several automating devices simultaneously invoke different external functions and or external software components in the mobile device, wherein the external functions and/or external software components are simultaneously carried out in the runtime environment.

Also, several automating devices can simultaneously invoke the same external function and or external software component in the mobile device, wherein several instances of the same external function and/or of the external software component are carried out in the runtime environment.

Alternatively, there is the possibility that several automating devices can invoke the same external function and/or external software component in the mobile device, and that a single instance of the function or of the software component is carried out and used in the runtime environment of the mobile device.

The system according to the invention is distinguished in that the mobile device has a runtime environment in which at least one software component is hosted and is capable of running, and that the technological device comprises a connection module for invoking the execution of the at least one software component in the mobile device.

The technological device preferably comprises a recognition module for recognizing the mobile device located in its vicinity. The recognition device can be designed as an approximation sensor such as an NFC sensor.

Other details, advantages and features of the invention result not only from the claims, the features to be gathered from them—by themselves and/or in combination—, but also from the following description of preferred exemplary embodiments to be gathered from the figures.

Figure 2:
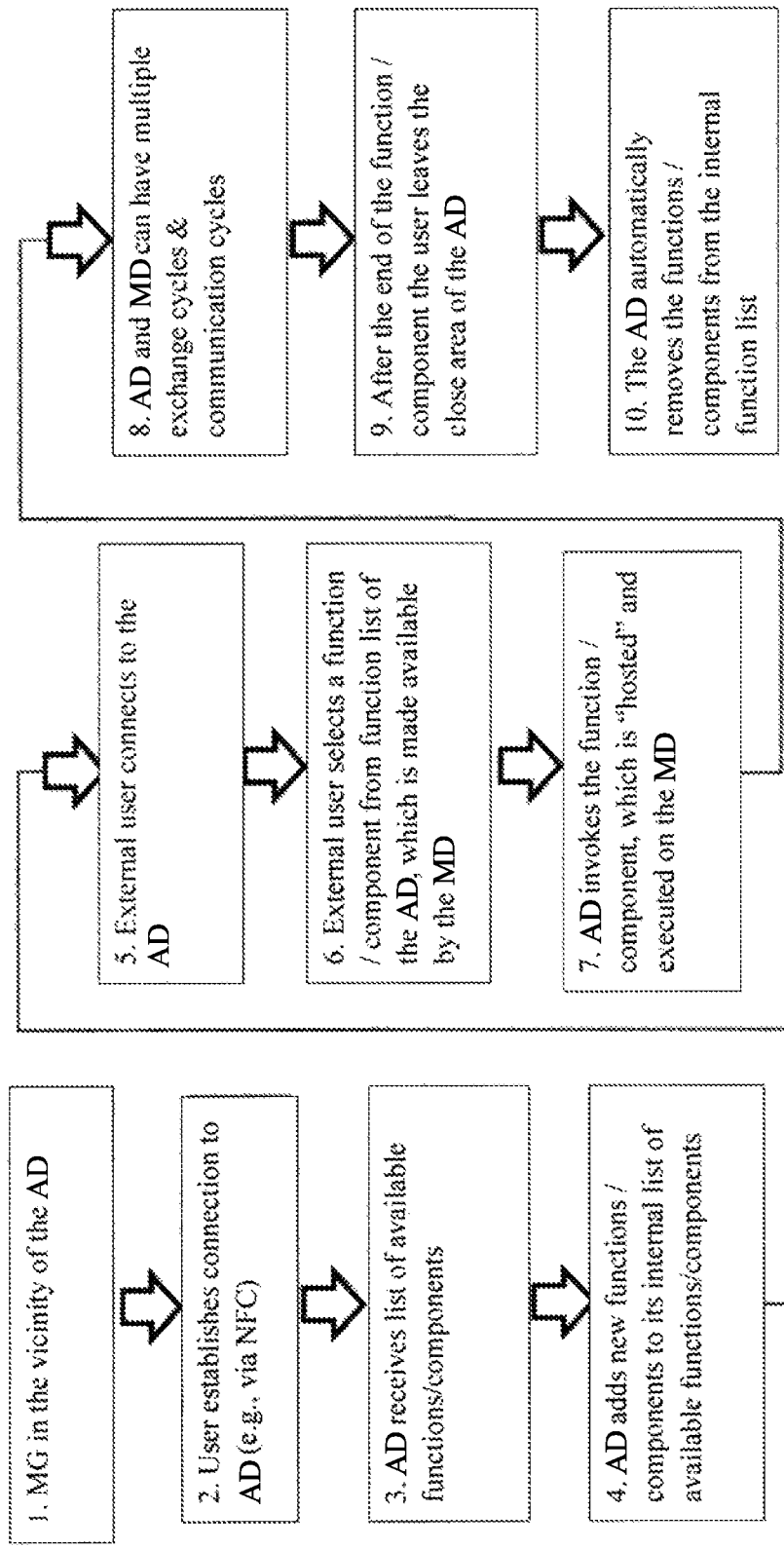
Figure 3:
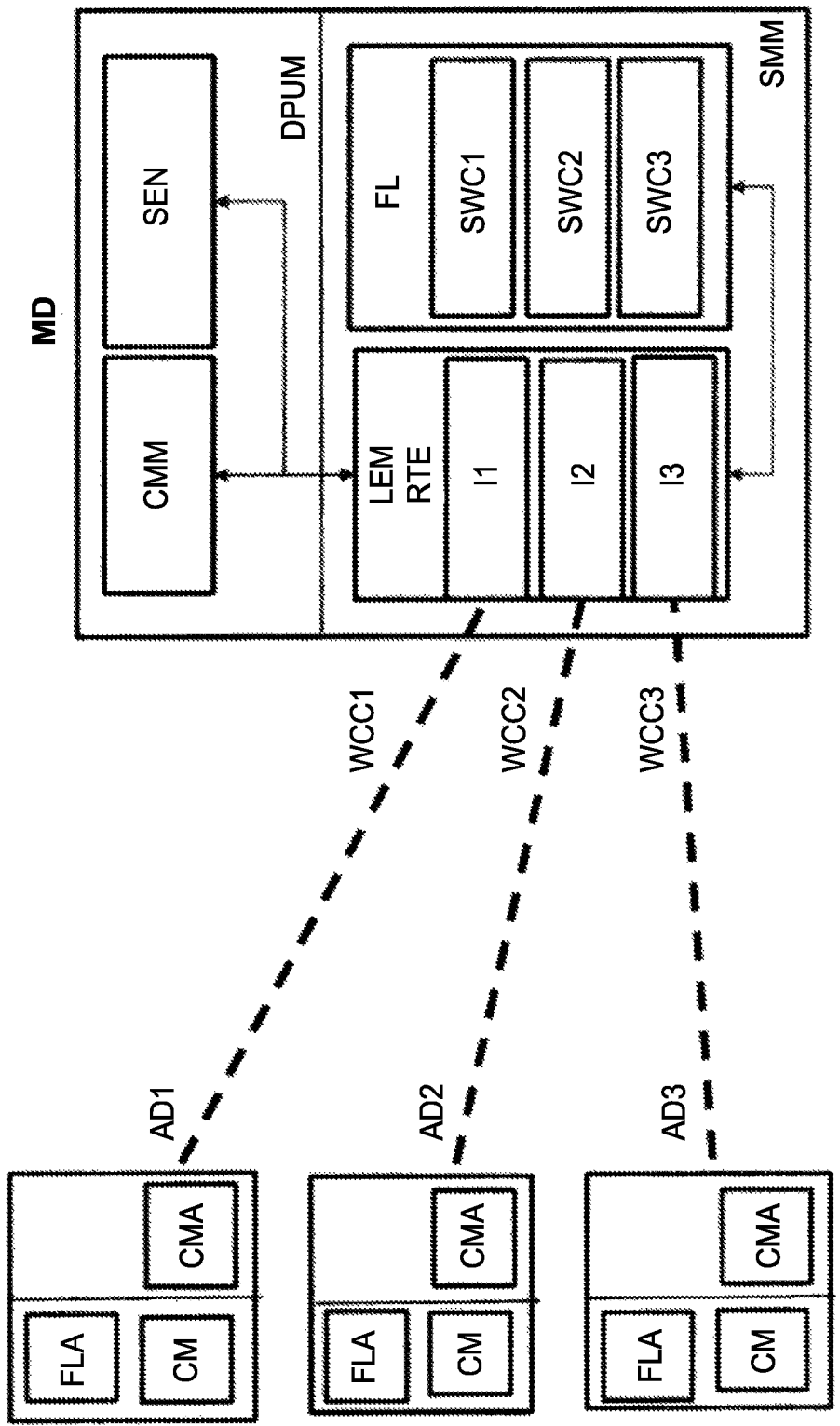
Figure 4:
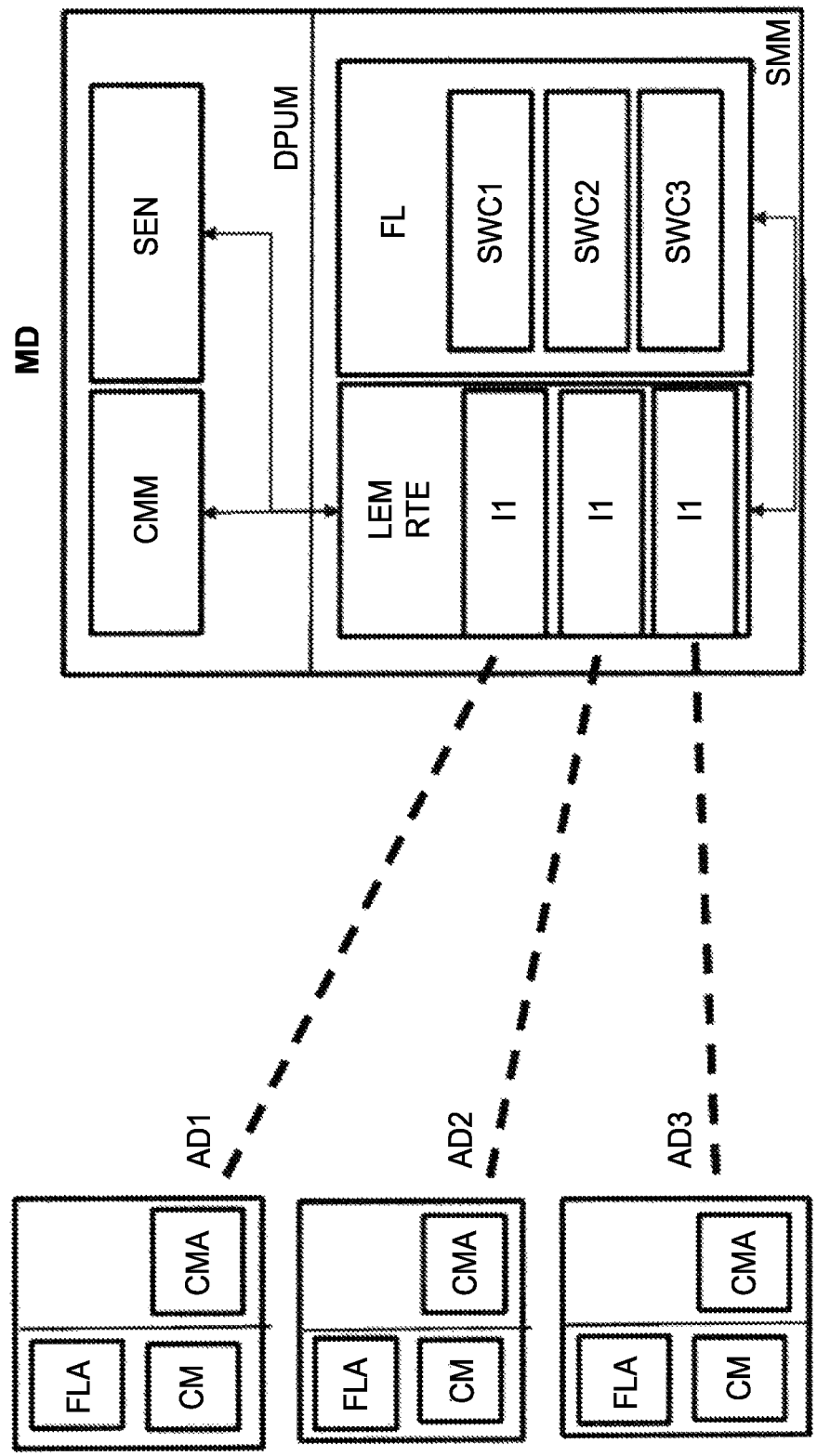
Figure 5:
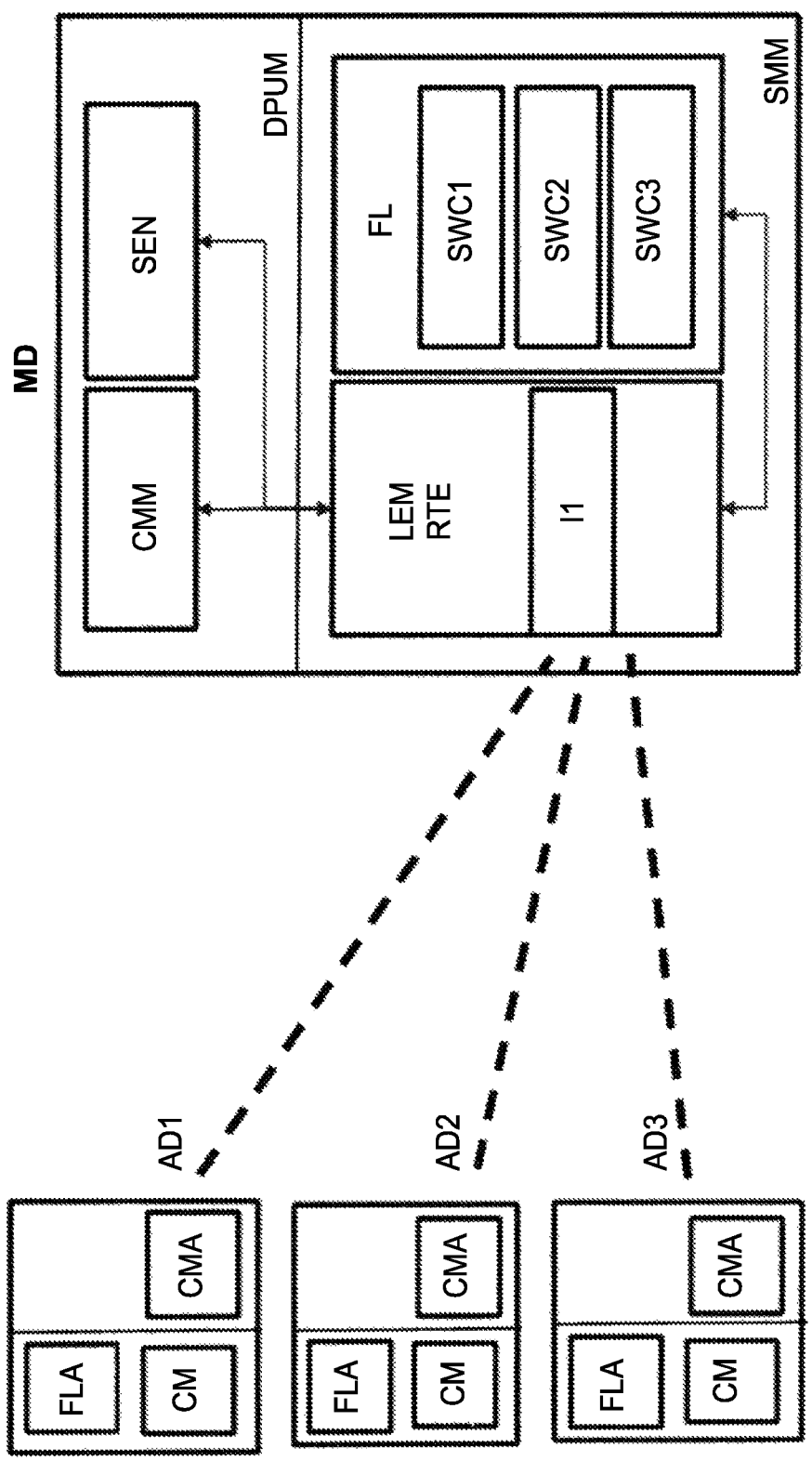

In the drawings:

FIG. 1 shows a first embodiment of a system for operating a technological device by a mobile device, FIG. 2 shows a schematic view of method steps for broadening the scope of the functions of a technological device by a mobile device, FIG. 3 shows a second embodiment of the system, wherein several automating devices each utilize a software component in the mobile device, FIG. 4 shows a third embodiment of the system, wherein several automating devices each utilize an instance of the same software component in the mobile device and FIG. 5 shows a fourth embodiment of the system, wherein several automating devices utilize the same instance of a software component in the mobile device.

FIG. 1 shows in a purely schematic manner a first embodiment of a system SYS for operating and broadening the functions of a technological automation device AD while using a mobile device MD.

A technological device AD in the sense of the invention comprises in particular devices of automating technology such as Controller (PLC; Programmable Logic Controller), actors and/sensors.

The technological device AD, which is designated in the following as an automating device, comprises customary modules of a data processing unit DPUA, namely, a processor module PMA, a storage module SMA for storing software such as firmware, software components and data, an input-output module IOA and a communication module CMT with transmitting-receiving module TRMA for communicating with other devices.

A mobile device MD in the sense of the invention comprises mobile, intelligent devices (Smart Devices) such as a smartphone, tablet or PDA. The mobile device MD also comprises customary modules of a data processing unit DPUM, namely a processor module PMM, a storage module SMM for storing software such as programs and data, an input-output module IOM for detecting sensors SEN and a communication module CMM with the transmitting-receiving module SEM.

A communication between the mobile device MD and the automating device AD takes place via a wireless communication connection WCC based on a close field technology, wherein a communication connection WCC between the automating device AD and the mobile device MD is only established if the mobile device MD is in the immediate vicinity of the automating device AD.

In order to recognize the mobile device MD, the automating device AD comprises a recognition module RMA which is designed as an NFC transmitter (NFC=Near Field Communication; close field communication) and communicates with the sensor SEN which is arranged in the mobile device and designed as an NFC transmitter. After the recognition of the mobile device MD the wireless communication connection WCC is established. The communication connection WCC can be established in NFC technology by the NFC transmitter or in WI-FI or BLUETOOTH technology by WI-FI or Bluetooth transmitter-receiver modules.

According to the invention one or more software components SWC1 . . . SWCN and a loading and execution module LEM with runtime environment RTE for executing at least one of the software components SWC1 . . . SWCN are hosted in the mobile device MD M. Each software component SWC1 . . . SWCN is associated with at least one function F1 . . . FN which is/are made available during the execution of the software component SWC1 . . . SWCN. The functions F1 . . . FN are filed in a function library FL.

The automating device AD is designed according to the invention for invoking the software components SWC1 . . . SWCN made available by the mobile device MD and for using its functions F1 . . . FN as a supplement or an alternative to already implemented device functions DFA. For this, the automating device AD comprises a connection module CM with which the software components SWC1 . . . SWCN hosted in the mobile device MD can be invoked via the communication module CMA, CMM and executed on the mobile device MD.

Upon an approximation of the mobile device MD to the automating device AD the mobile device MD is recognized by the recognition module RMA and a client-server connection is established, wherein the automating device AD assumes the function of a client and the mobile MD assumes the function of a server.

An interprocess communication such as, for example, an RPC communication (RPC=Remote Procedure Call; call of a remote procedure) is made available by the connection module CM by means of which the automating device AD can execute and use the software components SWC1 . . . SWCN in the loading and execution module LEM of the mobile device MD. The mobile device MD supplies information to the automating device AD or makes the functions F1 . . . FN and services available which are executed by the software components SWC1 . . . SWCN in the mobile device MD. The scope of the functions of the automating device can be temporarily expanded by the method according to the invention without changing or influencing the hardware and/or firmware of the automating device AD.

FIG. 2 shows method steps for broadening the scope of the functions of the automating device AD by a mobile device MD. The recognition of the mobile device MD in the vicinity of the automating device AD takes place in a first method step by detecting the spatially limited communication field of the NFC sensor SEN of the mobile device MD by the recognition module RMA of the automating device AD.

As soon as the mobile device is located in the vicinity of the automating device and the communication connection has been established, a user of the mobile device MD can establish a connection to the automating device AD in a second method step, wherein recognition messages and login messages can be exchanged. The mobile device MD informs the automating device AD that it can make software components SWC1 . . . SWCN available for the automating device AD, i.e., in particular that it is "a function supplier for automating functions".

After the establishment of the communication connection WCC the mobile device MD sends a function list FLM to the automating device AD in a third method step which contains the functions F1 . . . FN which are available on the mobile device MD. The function list FLM is transmitted by a controller of the loading and execution module LEM to the automating device AD. The loading and execution module as well as the controller can be part of a loadable application or of the operating system of the mobile device MD.

In a fourth method step the automating device AD adds the functions F1 . . . FN made available from the mobile device MD to an internal function list FLA as available features. As a result, the scope of the functions of the automating device AD is broadened without the hardware of the automating device AD having to be expanded or changed.

The concept "features" denotes the functions F1 . . . FN which are made available to an external user, that can be a person or a system, via UML (UML=Unified Modeling Language; unified modeling language).

Upon the inquiry by the connection module CM via the communication modules CMA, CMM the function list FLM is transmitted by the loading and execution module LEM to the automating device. The function list FLM contains the available functions F1 . . . FN. The information exchange also comprises interface descriptions and service level agreements which must be checked by the automating device AD. After the check, compatible functions are entered into the function list FLA of the automating device AD.

Function descriptions known from the prior art such as AIDL, Cobra IDL, REST, SOAP and others as well as service level agreements can be used for the exchange of data between the mobile device MD and the automating device AD.

After the new functions have been added to the internal function list FLA of the automating device AD as available functions, they can be used by an external user.

According to method step five an external user can connect to the automating device AD. The external user can be the mobile device itself, a desktop user, a system, a software or another mobile device.

Thereafter, the external user can select a function from the function list FLA in method step six which is then invoked by the connection module CM according to method step seven.

The invocation is transmitted via the communication modules CMA, CMM to the loading and execution module LEM. The loading and execution module LEM loads the corresponding function from the function library FL and executes a software component associated with the function in the appropriate runtime environment RTE with appropriate resources of the mobile device MD such as sensors SEN and/or storage SMM. The result of the invoking of the function is transmitted back to the connection module CM. During the execution of the function in the mobile device MD the latter can also access other resources of the mobile device MD as needed. This can be internal resources such as, for example, sensors SEN or external resources such as, for example, networks or a cloud.

Technologies known from the prior art such as RPC (Remote Procedure Call), micro-services, web services or similar technologies can be used to invoke the external functions.

The NFC technology is used for the data transfer in the described exemplary embodiment. Alternatively, the communication can also be carried out, e.g., via Wi-Fi using communication protocols such as IOT protocols, e.g., XMPP ASOP.

According to method step eight the device and the components can comprise multiple cycles of exchange and communication as a function of the implementation of the external functions and/or software components.

A software component can comprise, e.g., many different functions, e.g., mathematic functions. The automating device AD can sequentially query, e.g., tan functions, cos functions, sin functions. There is also the possibility that the software component returns an intermediate value and the automating device AD inquires whether this result is in order or must be more precisely calculated, e.g., calculate the number pi more precisely so that a circular movement of a robot arm can be calculated more precisely by the AD.

After the ending of the execution of the software component the user can leave the close area of the automating device in method step nine so that in method step ten the automating device automatically removes the external functions from the internal function list FLA.

If the mobile device MD should be removed out of the close area of the automating device AD during the execution of a software component, this is treated by the automating device AD as a "normal" error in its own firmware.

After the external functions were removed from the internal function list FLA the automating device AD returns back into its normal operating mode. Only "history locks" can display the broadening of hardware and the invoked functions. It is important to note here that a change in the firmware did not take place.

FIGS. 3 to 5 show exemplary embodiments, wherein several automating devices AD1 . . . AD3 use a mobile device MD for function broadening.

FIG. 3 shows an embodiment wherein several automating devices AD1, AD2, AD3 invoke different software components SWC1, SWC2, SWC3. Consequently, a single mobile device MD supports several automating devices AD for executing different functions F1 . . . FN and/or software components SWC1 . . . SWC3.

The embodiment according to FIG. 3 corresponds to the embodiment shown in FIG. 1 with the exception that the communication module CMM of the mobile device MD makes several inputs and outputs available for the communication. Therefore, each automating device AD1 . . . AD3 can communicate via its own communication connection WCC1, WCC2, WCC3 with the mobile device MD in order to execute different software components SWC1, SWC2, SWC3. It is provided that instances I1, I2, I3 of the software components are loaded into the loading and execution module LEM and are executed in it. Furthermore, the mobile device MD is designed to handle multiple inquiries "session handling".

FIG. 4 shows an embodiment wherein several automating devices AD1, AD2, AD3 invoke the same software component SWC1 but with different instances I1. That means that the mobile device MD supports several automating devices AD1, AD2, AD3 for similar functions and/or software components which are executed, however, in different instances I1. In the exemplary embodiment shown, each of the automating devices AD1, AD2, AD3 uses the same software component SWC1 but without an exchange of data by this software component. In this embodiment the runtime environment is capable of generating an instance I1 of each software component SWC1 for each automating device AD1, AD2, AD3. In other words, for each inquiry of an automating device AD1, AD2, AD3 a local copy of the required software component SWC1 is generated which is used and exists only for a certain inquiry, i.e. exclusively for a certain automating device.

FIG. 5 shows an embodiment wherein several automating devices AD1, AD2, AD3 use the same instance I1 of the software component SWC1. Each automating device AD1, AD2, AD3 uses the same software component SWC1 with an exchange of data by this component. The runtime environment RTE forwards all inquiries from automating devices AD1, AD2, AD3 to this one software component SWC1.

The offered software component SWC1 can be, for example, a databank for localizing text (language translation). Each automating device AD1, AD2, AD3 needs this component in order to display data in a certain language to users.

This scenario is especially valid when the component makes it possible to exchange data between automating devices. E.g., an automating device AD1 in the form of a sensor can allow measured values to be calculated in the instance I1 of the mobile device MD which a second automating device AD2 in the form of a controller later retrieves or allows to be further calculated in the instance I1 of the mobile device.

The invention is especially suited for the following instances of application:

Access to internal functions: There is the possibility by the method according to the invention and the system according to the invention that automating devices AD use functions of the software components SWC1 . . . SWCN in the mobile device MD which have no direct relationship to the mobile device MD. E.g., a function for translating concepts for example from the French language into the English language which are executed in the mobile device MD but are displayed on or used in the automating device is cited here.

Access to external functions: Furthermore, the automating device AD can use functions of the software components SWC1 . . . SWCN which make use of hardware components and software components of the mobile device MD. For example, this can be a function which utilizes the GPS hardware of the mobile device MD. Then, GPS coordinates can be used, to the extent that the mobile device is located in the vicinity of the automating device, to commission an automating device which is located at an unknown location.

Internal hosting with license check: In another application the automating device AD can load the software components SWC1 . . . SWCN and host them in the memory as well as in a runtime environment of the automating device. In this embodiment the software component and its functions can only be used if the mobile device is accessible, i.e. if it is located in the vicinity of the automating device AD.

Temporary "upgrading": Another application provides that the automating device AD checks whether the software components SWC1 . . . SWCN of the mobile device MD have a newer version in order to use it instead of their own, older version.

Temporary "downgrading": Finally, the software components SWC1 . . . SWCN of the mobile device MD can be used in any case even if these versions are older than the versions of the software components of the automating device AD.

Moreover, the method according to the invention offers advantages when starting up and diagnosing automating devices. The starting up and diagnosing are usually only carried out at certain times during the service life of an automating device. The start-up here is the first installation and setup of the automating device. A diagnosis is performed at certain time intervals or when the automating device is causing problems. An access to the hardware and software of the technological device such as, for example, memory or firmware is made available during the startup and also in diagnosis.

Such installation and diagnosis functions are usually made available 24 hours and 7 days a week by the automating device but only 2% to 3% of the total service lifetime of the automating device is used. Consequently, the automating device is susceptible on the one hand to outside access for the entire service life of the automating device and on the other hand hardware resources such as firmware memory and runtime memory are required.

The method according to the invention can limit accesses as well as save resources in the automating device since the software components are made available by the mobile device for specific startup functions or diagnosing functions.

The method according to the invention makes available the resources for hosting startup functions and diagnosing functions primarily by the mobile device. The automating device requires only limited resources for establishing and developing the communication connection with the mobile device.

The already available resources of the mobile device such as sensors or communication modules can be used in order to expand the possibilities of the startup functions in diagnosing functions, e.g., the addition of geo data to a diagnostic protocol or the scanning of a QR code of the automating device in order to obtain more information for the startup.

Another area of application of the method according to the invention is the licensing of functions of the automating device. The licensing of functions of the automating device requires a set of software tools and a physical connection to the automating device. For example, the license associated with an automating device can be checked by a mobile device. Also, a function-based or component-based license can be checked by the mobile device. Furthermore, there is the possibility of a calculation of costs, e.g., payment upon invocation of a function which can be made by the mobile device. The mobile device can also comprise other license-checking mechanisms, e.g., username/password, Internet check, communication with the environment of the automating device.

The invention claimed is:

1. A method for starting up and diagnosing an automating device in a form of a controller, a sensor, or an actor, by using a software component comprising device-specific starting up functions and diagnosing functions by means of a mobile device;

wherein the automating device comprises a first approximation sensor that detects a closeness of the mobile device to the automating device;

wherein the first approximation sensor generates a first spatially limited communication field;

wherein the mobile device comprises a second approximation sensor which generates a second spatially limited communication field;

wherein, upon an approximation of the first and second spatially limited communication fields, a wireless communication connection is established by a superposing of the first and second communication fields between the automating device and the mobile device; and wherein information is exchanged via the wireless communication connection between the automating device and the mobile device;

the method comprising:

hosting the software component comprising the device-specific starting up functions and diagnosing functions in a runtime environment of the mobile device, wherein the software component is an external software component which is invocable by the automating device for executing the device-specific starting up functions and diagnosing functions in the runtime environment of the mobile device;

after establishing the wireless communication connection, transmitting a function list of the external available software component to the automating device;

adding the external available software component to an internal function list of already available internal software components of the automating device;

invoking the software component via the wireless communication connection by a function call of the automating device; and executing and using the device-specific starting up functions and diagnosing functions by means of the automating device in the runtime environment of the mobile device.

2. The method according to claim 1, wherein a plurality of automating devices simultaneously invokes a plurality of external available software components in the mobile device, and wherein the plurality of external available software components is simultaneously executed in the runtime environment.

3. The method according to claim 1, wherein a plurality of automating devices invokes the same external available software components in the mobile device, and wherein several instances of a same external available software components are executed in the runtime environment.

4. The method according to claim 1, wherein several automating devices invoke the same external available software components in the mobile device, and wherein a single instance of the external available software components is executed and used in the runtime environment of the mobile device.

5. The method according to claim 1, wherein the mobile device is selected from the group consisting of a smartphone, a tablet, and a personal digital assistant.

* * * * *